United States Patent
McKinley, Jr. et al.

(10) Patent No.: US 6,665,377 B1
(45) Date of Patent: Dec. 16, 2003

(54) NETWORKED VOICE-ACTIVATED DIALING AND CALL-COMPLETION SYSTEM

(75) Inventors: James W. McKinley, Jr., Bowie, MD (US); Alexander I. McAllister, Mercerberg, PA (US); Rita Yadav, Ellicott City, MD (US); John L. Eidsness, Bowie, MD (US)

(73) Assignee: Verizon Federal Inc., Washington, DC (US)

( * ) Notice: Subject to any disclaimer, the term of this patent is extended or adjusted under 35 U.S.C. 154(b) by 98 days.

(21) Appl. No.: 09/680,620

(22) Filed: Oct. 6, 2000

(51) Int. Cl.⁷ ............................ H04M 1/64; H04M 3/42
(52) U.S. Cl. ................... 379/88.01; 379/88.02; 379/88.03; 379/88.04; 379/88.07; 379/88.17; 379/88.18; 379/201.02; 379/212.01
(58) Field of Search .................... 379/88.01, 88.02, 379/88.03, 88.04, 88.05, 88.06, 88.07, 88.08, 88.16, 88.17, 88.18, 201.01, 201.02, 211.02, 212.01; 455/557, 569, 575; 704/246, 251, 258, 270

(56) References Cited

U.S. PATENT DOCUMENTS

| | | | |
|---|---|---|---|
| 5,325,421 A | * 6/1994 | Hou et al. ................ 379/67 |
| 5,572,583 A | 11/1996 | Wheeler, Jr. et al. ........ 379/207 |
| 5,583,564 A | 12/1996 | Rao et al. .................... 348/14 |
| 5,991,364 A | 11/1999 | McAllister et al. ......... 379/88.01 |
| 6,049,594 A | * 4/2000 | Furman et al. ............. 379/67.1 |
| 6,097,803 A | * 8/2000 | Sbisa .......................... 379/230 |
| 6,144,723 A | * 11/2000 | Truchon et al. ........... 379/88.01 |
| 6,229,880 B1 | * 5/2001 | Reformato et al. ....... 379/88.01 |
| 6,233,316 B1 | * 5/2001 | Schier et al. ............. 379/88.03 |
| 6,236,715 B1 | * 5/2001 | Wong ........................ 379/88.03 |
| 6,363,411 B1 | * 3/2002 | Dugan et al. .............. 709/202 |

\* cited by examiner

*Primary Examiner*—Allan Hoosain
(74) *Attorney, Agent, or Firm*—Leonard C. Suchyta; Loren C. Swingle; Naren Chaganti

(57) ABSTRACT

A networked system of voice-activated dialers is described. When a calling party using a local voice-activated dialer utters a phrase which indicates that information to reach a called party may be available at a remote site, a network connection is established to the remote site, spoken words or phrases are transmitted to the remote site, and the called party information is obtained from the remote site. The called party information is used to provide additional networked services to the calling party such as call-completion, voice messaging, or paging. These additional networked services may use the Public Switched Telephone Network (PSTN) and an existing signaling network such as the Signaling System No. 7 network.

17 Claims, 4 Drawing Sheets

NETWORKED VOICE-ACTIVATED DIALING AND CALL-COMPLETION SYSTEM

TECHNICAL FIELD

The present invention is related in general to enhanced telephony services, and in particular, to a networked voice-activated dialing and call-completion system.

BACKGROUND

With the availability of speech recognition systems that can provide real-time services for large-vocabulary continuous-speech applications in a telephony bandwidth, several applications have become possible. One such application is a voice-activated dialer for corporate-wide service. In a typical voice-activated dialer, a corporation or a large association may establish for itself a voice-activated call-routing system whereby a calling party connected to the voice-activated dialer can speak the name of a called party. A speech recognizer connected to the voice-activated dialer recognizes the speech and matches a called party. Thereafter, a call-competition device coupled to the voice-activated dialer may complete the call, establishing a voice path between the calling party and the caller party.

The number of corporate-wide voice dialer systems is expected to increase in number. But there is no system that can take advantage of the specific services offered by each such system to provide a more advanced service to a calling or a called party. Accordingly, there is a need for advancement in the art.

SUMMARY

As used in this application, the word "call" or the phrase "telephone call" includes any voice, text, or video call, including a mode of information transfer that combines any of these methods. Further, though for simplicity a description of a traditional telephone call is made herein, it should be understood that any multimedia communication method may be substituted for the method of communication described. Additionally, a "party" is a natural person or a computer program; and a "calling" party should be understood as a party that initiates an attempt to communicate with a "called" party.

In an aspect, the present disclosure is directed toward a networked system of voice-activated dialers (VAD). These VADs are, for the sake of convenience, termed "local" and "remote." The words "local" and "remote" may indicate VADs that are geographically apart from each other, VADs that are owned or controlled by different entities, or VADs that perform different functions.

Each VAD has a speech recognizer specifically tuned to service a directory of names containing a pre-determined group of subscribers. The speech recognizer may be speaker-dependent, speaker-trained (e.g., template-based), or speaker-independent (for example, phoneme-based), and may implement techniques such as Hidden Markov Model or neural networks.

Each VAD is networked with at least one other VAD via a communication network such as a private Ethernet or a public network such as the Internet. Further, each VAD is communicatively coupled to a telecommunication network such as the Public Switched Telephone Network (PSTN). Each VAD may be identified by a unique method of addressing; the method of addressing designed to enable identification easy. In an aspect, each VAD publishes its address to a centralized server to resolve addressing issues.

When a calling party wishes to make a telephone call to a called party, the calling party dials a pre-designated telephone number to connect with a first VAD. The calling party then utters the name of the called party, and additionally specifies a second VAD or other information that could be used to find a second VAD by means of which the called party may be reached. The calling party's speech is parsed, and interpreted by a first speech recognizer coupled to the first VAD. Subsequently, the first recognizer or other software or hardware devices coupled to the first recognizer identifies the second VAD. Thereafter, at least a portion of the calling party's spoken utterance is transmitted to the second VAD.

The second VAD receives the calling party's spoken utterance. Subsequently, a second speech recognizer coupled to the second VAD matches the calling party's spoken utterance with a name and a telephone number in a database coupled to the second VAD. The second VAD then transmits to the first VAD information suitable for call completion. Thereafter the first VAD completes a telephone call between the calling party and the called party by instructing an appropriate switching element in the PSTN, or by using traditional call completion methods.

In another aspect, the first VAD transmits additional information identifying the calling party to the second VAD. In an embodiment, the first VAD may transmit the calling party's location. The second VAD receives this additional information and may use it in determining the appropriate called party. In a further aspect, the second VAD may transmit one or more matches based on the spoken utterance by the calling party, allowing the calling party to determine the appropriate called party.

In a further aspect, the present invention includes a method of using signaling system No. 7 (SS7) to complete the calling party's call. Once the called party is identified by the second VAD, the called party's information is routed back to the first VAD, whereupon an SS7 packet is transmitted to the called party station to determine if the called party station is available. If the called party station is busy or otherwise not available, the calling party is provided with an option to leave a voice message at a designated station.

In case the called party cannot be located at the second VAD, an alternative method to locate the called party such as attempting to locate the calling party at a third VAD may be accomplished by the first VAD. Alternatively, the first VAD or the calling party may terminate the call.

BRIEF DESCRIPTION OF THE DRAWINGS

These and other features, objects, and advantages of the present invention may be more readily understood from the following detailed description and the accompanying drawings, where like numerals represent like parts throughout the several views, and wherein.

DETAILED DESCRIPTION

Figure 1:
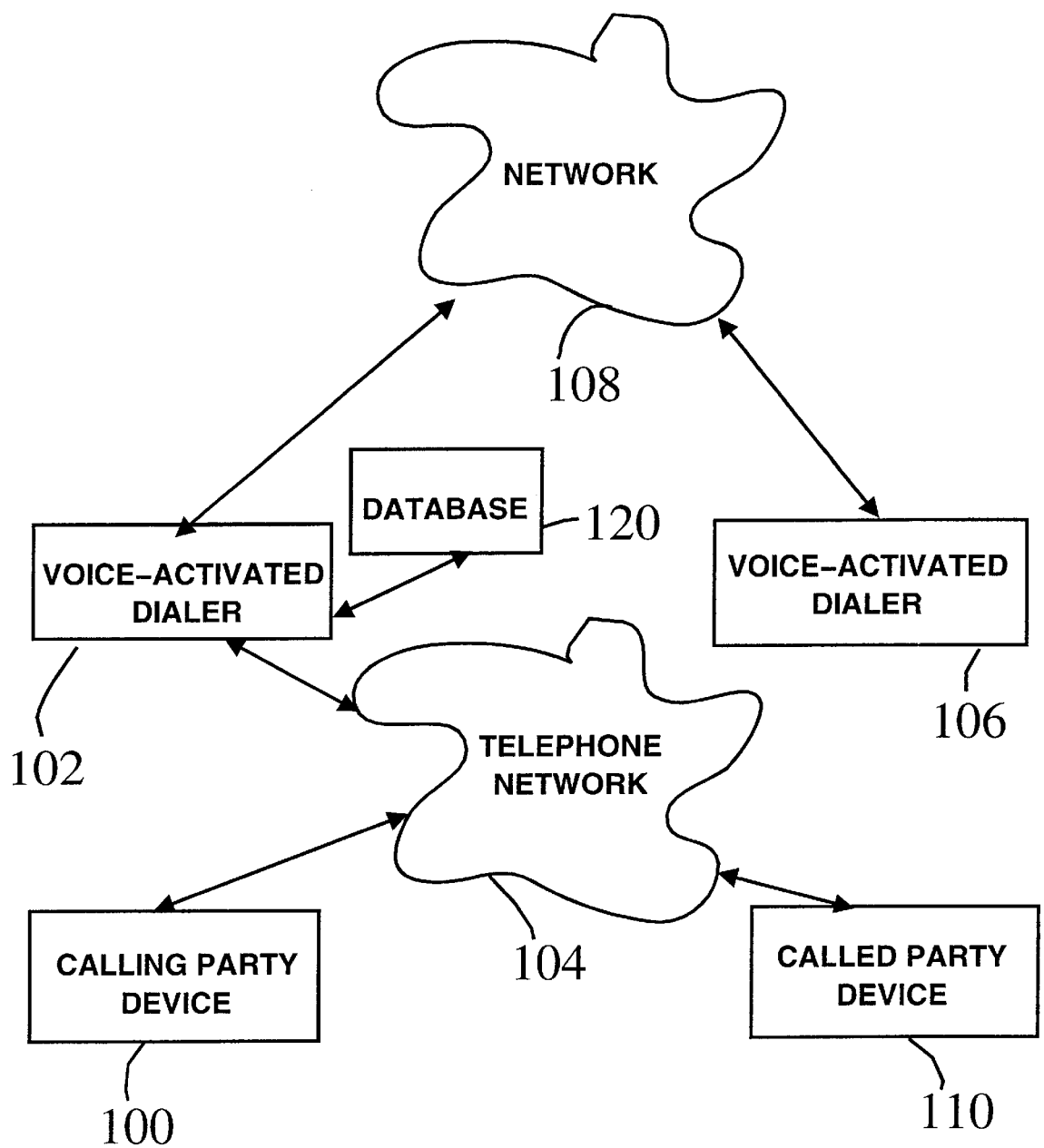
FIG. 1 is an illustrative architecture of a telephony network including a first VAD and a second VAD

Referring to FIG. 1, in an illustrative embodiment, a calling party device 100 is connected to a first voice-activated dialer (VAD) 102 via a telecommunication network 104 such as the Public Switched Telephone Network (PSTN). The first VAD 102 is connected to a second VAD 106 via a data communications network 108 such as the Internet. Also connected to the telecommunication network 104 is a called party device 110. Coupled to the first VAD 102 is a database 120, which could be a commercial database such as a Relational Database Management System marketed by the Oracle Corporation.

The calling party device 100 is an interactive device with a transmitter and a receiver to transmit and receive analog or digital data over the telecommunication network 102. Examples of devices that could function as calling party device include a wire-line or a wireless telephone handset, a wireless web browsing device, a videophone terminal, or a personal computer. A user may interact with another user via voice, video, text, or any combination of these methods. Alternative embodiments of the calling party device 102 include a processor such as a Pentium® III microprocessor; memory such as semiconductor memory; an input device such as a keyboard, a microphone, a joystick or a mouse; and an output device such as a CRT, flat panel display, or a speaker. In an embodiment, the calling party device 100 may be connected to a data communications network such as the Internet 106 either directly via a local Area Network, or via a dial-up network connection such as one available via an Internet Service Provider.

Examples of the called party device 110 include a telephone handset, a videophone terminal, a personal computer, a voice mailbox, or other devices that are capable of receiving data for immediate access or for storage and retrieval by the called party.

The network includes a number of interconnected VADs and telephony network elements such as switching systems. The VADs are interconnected to each other via a data communication network such as the Internet. Each of the several interconnected VADs is identified by the other VADs coupled to the network. In an embodiment, the VAD is provided a unique Internet domain name suffix such as ".vox" indicating that the VAD provides voice-activated dialing services.

The telephony network may include any one or more elements such as a central office switch—e.g., a Class 5 Central Office switching system, a Private Branch Exchange (PBX), an IVR, or a tandem switch such as the Lucent 4ESS™. The switching systems are capable of establishing, maintaining and terminating a telephone call via signaling methods such as in-band signaling, out-of-band signaling (e.g., Common Channel Signaling System No. 7, or SS7), and channel-associated signaling (such as Integrated Services Digital Network, or ISDN). To accomplish these functions, the network elements are equipped with registers, programs and devices that are configured to receive, transmit and measure voice, video, data, or control information such as signaling information across the network. It should be noted that a network element may perform part or all the functions described herein, and some of the functions may be performed by an adjunct or other element communicatively coupled to the network element. Further, it should be noted that in some implementations all traditional switching functions are not necessary.

Figure 2:
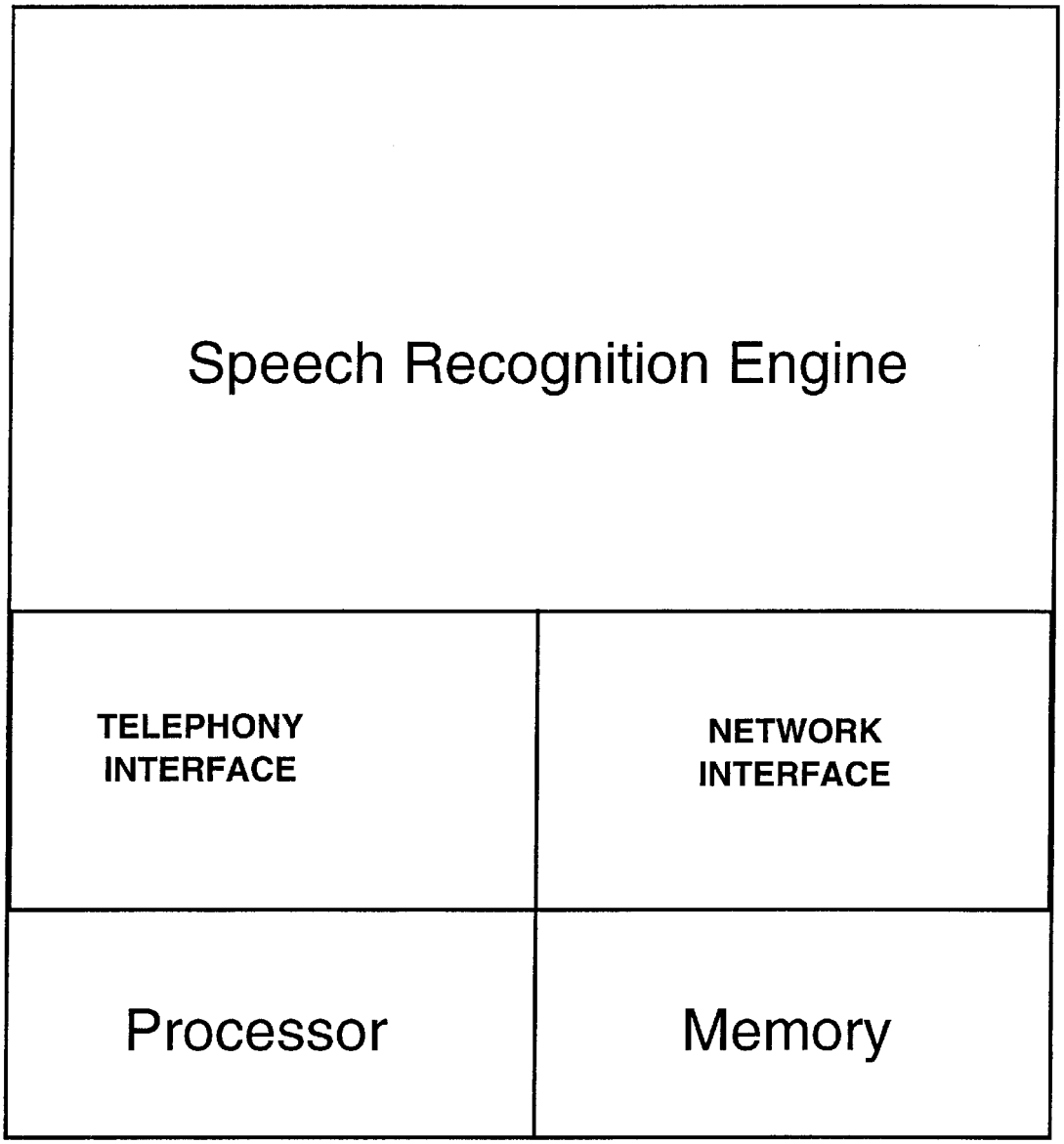
FIG. 2 is a block schematic of a voice-activated dialer (VAD) designed according to an embodiment of the principles disclosed herein.

Referring to FIG. 2, the first VAD 102 contains a general purpose microprocessor such as a Pentium III microprocessor or a specially programmed processor such as a digital signal processor or an Application-Specific Integrated Circuit (ASIC), a memory device such as semiconductor memory, a storage device such as a hard disk, a speech recognition engine (SRE), a data communications device such as an Ethernet card to interface with a packet switching network, and a telephony interface device such as a line or a trunk card to interface with a telephony network. In alternative embodiments, the first VAD 102 may establish a telephony network interface via the data communications device by coupling the data communications device to a private or a public packet-switched network—such as the Internet—and in turn establishing a connection with the Public Switched Telephone Network (PSTN) via the packet-switched network. The first VAD 102 additionally is configured with instructions that direct the processor to act in a programmed manner in response to an external event such as a connection with a caller, as will be explained below. Persons of ordinary skill in the art readily appreciate that such instructions may be written in a number of ways including by programming in micro code or in a high-level language such as the C programming language.

The first VAD 102 is implemented in an embodiment as a stand-alone system coupled to a telephone network and a data network such as the Internet. The stand-alone system can be configured to function as an interactive voice response (IVR) system, which is capable of receiving input from a party either in the form of spoken utterance or dual tone multi-frequency (DTMF) digits. In response, the IVR can be configured to prompt a user for additional DTMF or voice input, or may perform other telephony functions such as transferring a call, establishing a conference call, terminating a call, connecting the call to a destination station specified by the caller, and the like. An IVR can be built using hardware and software components supplied by vendors such as Natural Microsystems, Inc., of Framingham, Mass. Persons skilled in the art of telephony networks and computer telephony readily understand the construction and operation of an IVR, and therefore, such details are unnecessary in this disclosure.

In other embodiments, the first VAD 102 is additionally configured to function as intelligent peripheral (IP), which is a part of an Intelligent Network (IN). The IP can be configured to perform some functions presently performed by other elements of a telephone network such as the Service Control Point (SCP) or a Service Switching Point (SSP). In general, an IP is configured to provide announcements to a party—such as a calling party—and collect information—such as additional digits required or a spoken utterance—to complete a call. An example of an Intelligent Network is described in U.S. Pat. No. 5,583,564 to Rao et al., and an example of an IP is described in the U.S. Pat. No. 5,572,583 to Wheeler, et al., which descriptions are incorporated herein by reference in their entireties.

The SRE in the first VAD 102 may be a commercially available speech recognition system from sources such as Nuance Communications, Inc., of Menlo Park, California. The SRE may be a speaker-dependent recognizer, or a speaker-independent recognizer, either implemented in hardware or in software or in a combination of hardware and software. Further, the SRE may be configured as a continuous-speech, large-vocabulary, speaker-independent recognition system that could recognize speech based on a technique such as the Hidden Markov model (HMM) or Neural Network model. Persons skilled in the art of speech recognition systems readily understand the structure associated with each of these several types of recognizers. A speaker-independent recognizer may use a trained library of phonemes and a pre-computed vector quantizer codebook to achieve a high probability of matching a speaker's voice with a particular stored name. An example of a phoneme-based speech recognition system is described in U.S. Pat. No. 5,991,364 to McAllister, et al. In alternative embodiments, the SRE may be speaker-dependent, speaker-trained (e.g., template-based). Other configurations may include a continuous digit recognizer, which is configured to recognize a continuous stream of spoken digits such as a spoken telephone number. In one embodiment, the SRE functionality may be provided on a computer communicatively coupled to the first VAD 102. The SRE may be specifically tuned to service a directory of names containing a pre-determined group of subscribers.

The second VAD 106 includes a speech recognition engine (SRE), a telephony network interface device, and a data communication device to connect to a network such as the Internet 102. Though there are some similarities between them, the first VAD 102 and the second VAD 106 are not necessarily alike in all respects of construction and/or operation. However, it is assumed that the SRE included in the first VAD 102 and the SRE included in the second VAD 106 are configured to accept speech in a format that is similar or that which could be converted into an acceptable format.

Figure 3A:
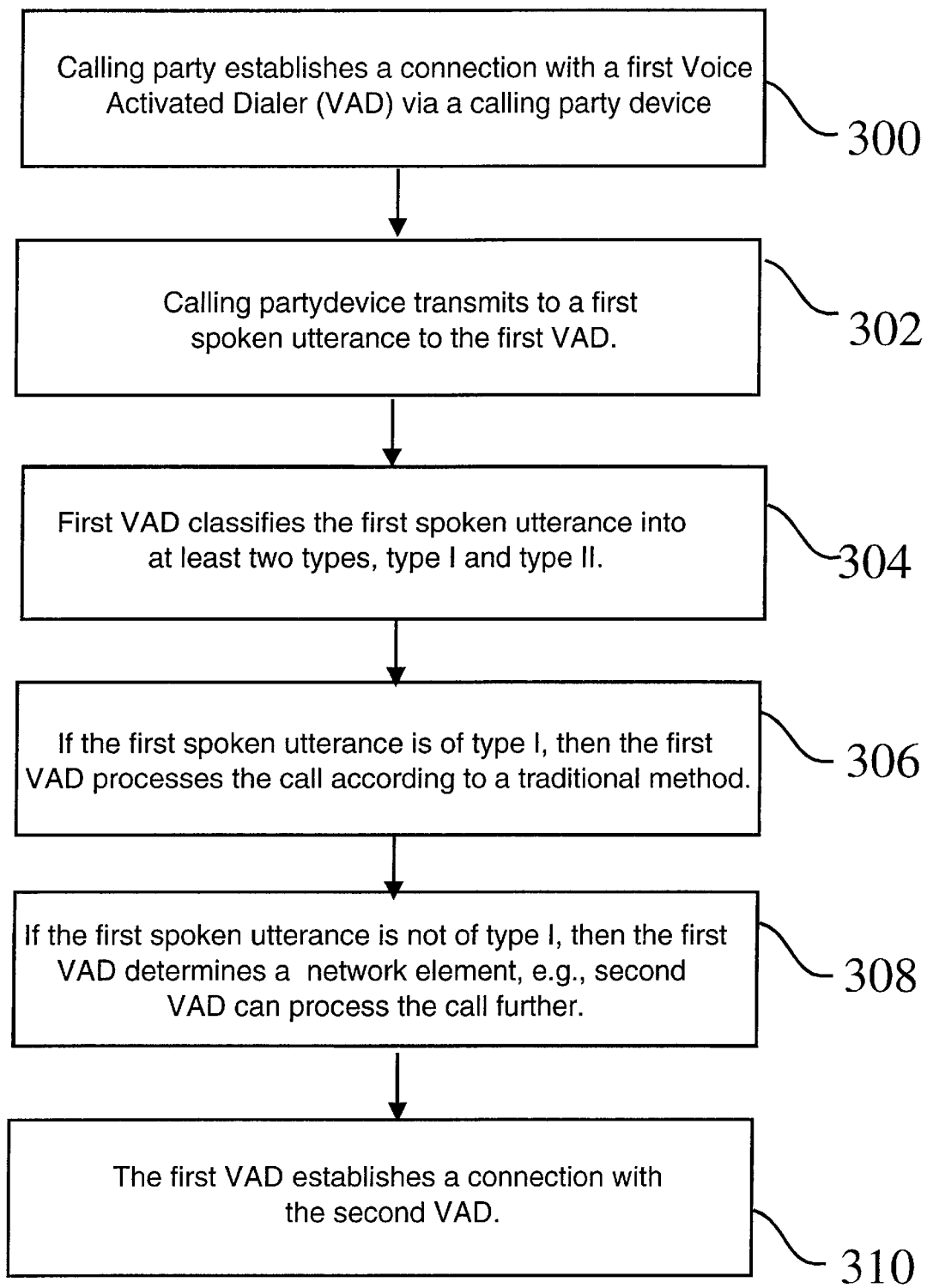
FIG. 3 is a flow diagram depicting an illustrative sequence of acts in accordance with an embodiment of the present invention.
Figure 3B:
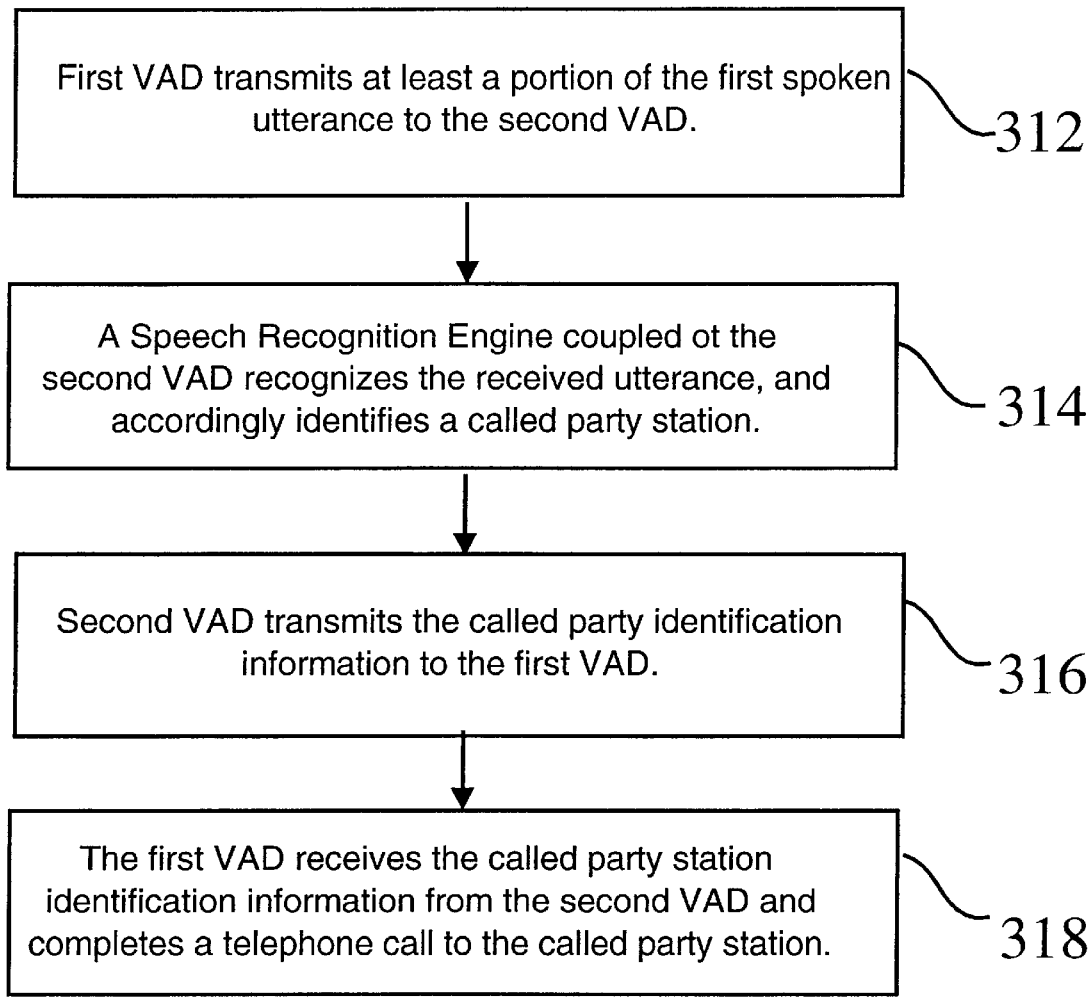

Referring to FIG. 3, a calling party (not shown) establishes a connection between the calling party device 100 and the first VAD 102 (step 300). In one embodiment, the calling party device dials a telephone number designated to reach the first VAD 102. As stated earlier, the first VAD 102 is configured as an IVR to provide voice prompts to guide the calling party.

When the calling party device 100 is connected to the first VAD 102, the first VAD 102 plays an appropriate voice prompt to the calling party 100 and requests for a called party number or name. The calling party then provides an input in the form of a first spoken utterance (step 302). In an embodiment, the first spoken utterance is stored in the first VAD 102.

The first VAD classifies the first spoken utterance into at least two types, type I and type II. A type I utterance is of such a nature that can be processed locally in its entirety. By local processing, it is meant that the first spoken utterance can be completely understood and processed by the first VAD 102 without the need to access the second VAD 106. Any utterance that is not capable of local processing is classified as a type II utterance, which requires additional information, such as information from the second VAD 106. Tables 1 and 2 provide examples of type I and type II utterances.

TABLE 1

Examples of Type I utterances

"John Doe"
"John Doe in Engineering"
"John Doe at work"
"John Doe at home"
"John Doe's cellular phone"
"six-oh-one five-five-five one-two-one-two"

TABLE 2

Examples of Type II utterances

"John Doe in COMPANY B"
"John Doe in COMPANY B, Florida"

TABLE 2-continued

Examples of Type II utterances

"John Doe in COMPANY B Marketing"
"COMPANY B in Florida"

It should be noted that the first VAD 102 may distinguish between a type I utterance and a type II utterance by recognizing a keyword such as "in" in a spoken utterance. This may also be programmed into a library or grammar of possible words that could be recognized by the first VAD 102—i.e., the vocabulary the first VAD 102 is tuned to recognize. Other methods of making such distinction are also possible. It should be recognized that there may be other keywords, or other programmed phrases that could trigger—i.e., indicate to—the first VAD 102 that the first spoken utterance may be better matched with a destination address—such as a called party station's telephone number or an E-mail box—at a different VAD such as the second VAD 106.

If the first spoken utterance is determined to be of type I, the first VAD 102 processes the call according to a traditional call-completion method (step 306). This call-completion procedure may include matching the spoken utterance with a destination station such as a telephone number—e.g., "202-555-1212"—and transferring the call to the telephone number after sending a hook-flash signal to a locally connected switch 104. Other embodiments may include establishing a second—in-band or out-of-band connection from the first VAD 102 to the switch 104 and forming a communication path from the calling party device 100 to the called party device 110 via the first VAD 102.

For example, if the first spoken utterance is of the type "John Doe at home," the first VAD 102 may be configured to identify that the calling party is attempting to reach John Doe at his home. If John Doe's home telephone number is stored in the first VAD 102, then that number is deemed to be the destination number. An intermediate step may include prompting the calling party to ensure that what the first VAD 102 interpreted is indeed what the calling party requested.

If, on the other hand, the first spoken utterance is determined to be of a type II utterance, the first VAD 102 first determines which network element—such as second VAD 106—is capable of providing information to complete the call (step 308). In an embodiment, a lookup operation in the database 120 accomplishes this task. Assume that the second VAD 106 is determined to be an appropriate location to provide information to process the call further.

In one embodiment, interconnecting special nodes such as VADs that are connected to the network 108 advantageously forms a "subnet" of VADs. To facilitate easy identification the VADs (i.e., the group of special nodes) may be given a unique address—e.g., a domain name suffix such as ".vox" for voice dialer nodes—indicating the special nature of the services provided by such nodes. A listing of all possible nodes and/or the type of services they provide may be stored in a centralized or a distributed location accessible to all nodes in the subnet. In this way, when a request from a user—such as the calling party's request to complete a call to a called party—requires additional information, the first VAD 102 may consult a listing—which could be locally or centrally available—to determine which node within the subnet may be able to service the request. It should be noted that the "subnet" may be a logical network instead of a physical network, or a combination thereof, and each node in the "subnet" may be part of disparate homogenous or heterogeneous networks connected by similar or dissimilar computing or communicating devices.

The first VAD 102 establishes a connection with the second VAD 106 via the network 108 (step 310). In an embodiment, this connection could be a packet-switched connection, such as that established via Transmission Control Protocol/Internet Protocol (TCP/IP). Other embodiments may include a circuit-switched connection or a point-to-point packet data connection via a data communication protocol such as X.25. It should be noted that this connection could already be established, in which case, this step may not be repeated for each transaction. Further, though FIG. 1 shows that the second VAD 106 is directly connected to the network 108, it should be understood that in alternative embodiments, security devices such as firewalls, password authentication systems, digital certifications, encryption mechanisms and others are also contemplated. Details of establishing a connection between computing devices such as the first VAD 102 and the second VAD 106 in the presence of such security devices are well known to persons skilled in the art, and therefore, such details do not need an elaboration.

After a connection is established with the second VAD 106, the first VAD 102 transmits at least a portion of the first spoken utterance to the second VAD 106 (step 312). For example, if the spoken utterance is "John Doe at Company B", the first VAD may partially truncate the utterance and send only the portion "John Doe" to a VAD that services company B. In an alternative embodiment, the first VAD 102 may first convert the first spoken utterance into a different form, such as into text, and transmit to the second VAD 106 the converted information. In a further alternative embodiment, the first VAD 102 transmits the first spoken utterance, any converted text and additional information such as the calling party's number—if the calling party device 100 were a telephone, its Automatic Number Identification (ANI), or if the calling party device 100 were a computer, its Ethernet address or the like—to the second VAD 106. Other examples of additional information that could be transmitted to the second VAD include the calling party's name, telephone number, picture, voice sample, or other biometric information.

The second VAD 106 is configured to receive the first spoken utterance from the first VAD 102. The SRE coupled to the second VAD 106 recognizes the first spoken utterance and determines the called party's identity. The called party's identity may be determined upon performing a lookup operation in a database connected to the second VAD 106 (not shown), or upon executing a query in a standard protocol—such as the Transaction Capabilities Application Part (TCAP)—to extract information from a telephony database such as a Service Control Point (SCP) (not shown). After determining the called party's identity, the second VAD 106 determines the called party device 110—for example, its telephone number (step 314). Where the first VAD 102 provides additional information, the second VAD 106 may use such additional information in conjunction with the first spoken utterance to determine the identity of the called party or to resolve any ambiguities.

The second VAD 106 thereafter transmits the called party telephone number to the first VAD 102 (step 316). The first VAD 102 thereafter initiates a telephone connection with the called party device 110 and completes the call (step 318). In one embodiment, the first VAD 102 accomplishes a hook-flash-transfer the calling party to the called party device 110 using traditional telephony methods. In alternative embodiments, the first VAD 102 is coupled to a signaling network such as an SS7 network, whereupon an Initial Address Message (IAM) is sent to a service switching point (SSP) connected to the called party device 110 to determine its status. If the called party device 110 is busy—as indicated by an appropriate ISDN-User Part (ISUP) message such as the Address Complete Message (ACM) or an Answer Message (ANM)—then the first VAD prompts the calling party to elect an option to either (i) leave a voice mail message for the called party; (ii) send a page; (iii) send an E-mail message; or (iv) terminate the call. After the calling party chooses an option, the first VAD 102 completes the call accordingly using any one of the traditionally known methods.

In an alternative embodiment, the first VAD 102 stores the called party number in the "local" database 120 for a predetermined period of time. Such local storage obviates the need to execute steps 310–318 if the first VAD 102 receives a similar request during the predetermined period of time. Any changes to the called party's location may also be tracked and stored in the database 120 for later usage.

If the second VAD 106 fails to determine the called party number, the first VAD 102 may, upon unsuccessfully waiting for a predetermined "timeout" period, or upon receiving an indication of failure from the second VAD 106, provide a voice prompt to the calling party and either (i) request the calling party to provide a further request, or (ii) terminate the call.

The foregoing describes networked voice-activated dialing and call-completion system. Persons of ordinary skill in the art may make several modifications and rearrangements to the disclosed invention without significantly departing from the spirit and scope of the principles described herein or without undue experimentation. For example, the order of the steps described may be altered, or some steps may be superfluous. Accordingly, all such deviations, departures, modifications and rearrangements should be understood to be properly within the scope of the appended claims.

What is claimed is:

1. A communication system comprising:

a first voice-activated dialer, said first voice-activated dialer comprising:

first processor;

first speech recognition engine coupled to the first processor;

first memory device coupled to the first processor, wherein the first memory device is configured to store instructions to direct the first processor to act in accordance with a first program code;

a second voice-activated dialer, said second voice-activated dialer comprising:

second processor;

second speech recognition engine coupled to the second processor; and a communication device to establish a communication path between the first voice-activated dialer and the second voice-activated dialer;

both the first voice-activated dialer and the second voice-activated dialer configured to Perform voice-activated dialing functions;

wherein the first program code directs the first processor receive a first spoken utterance from a calling party; to determine whether the first spoken utterance can be recognized at the second voice-activated dialer, and if so, to transmit at least a portion of the first spoken utterance to the second voice-activated dialer via the communication path; and, in response, to receive information helpful to further process the calling party's call.

2. The communication system as in claim 1, further comprising a telephony network interface device coupled to the first voice-activated dialer.

3. The communication system as in claim 2, further comprising:
   instructions stored in first memory device, said instructions configured to complete the calling party's call to a called party.

4. The communication system as in claim 1, further comprising:
   first storage device coupled to the first voice-activated dialer, said first storage device configured to store a list of keywords used to determine whether the first spoken utterance can be processed at the second voice-activated dialer.

5. The communication system as in claim 4, further comprising:
   instructions stored in the first memory device, said instructions configured to direct the first processor to complete the calling party's call in the first storage device.

6. The communication system as in claim 4, wherein the first storage device is a relational database management system.

7. A method of establishing a call between a calling party associated with a first voice-activated dialer and a called party station associated with a second voice-activated dialer that is communicatively coupled to the first voice-activated dialer, the method comprising the steps of:
   configuring the first voice activated dialer and the second voice-activated dialer to Perform voice-activated dialing functions;
   (a) receiving, at the first voice-activated dialer, a first spoken utterance from the calling party, said first spoken utterance indicative of a called party station to which a connection is desired;
   (b) recognizing the first spoken utterance to determine if the called party station can be identified at the second voice-activated dialer;
   (c) transmitting to the second voice-activated dialer at least a portion of the first spoken utterance;
   (d) in response, receiving information from the second voice-activated dialer, said information enabling the first voice-activated dialer to complete the calling party's call to the called party station.

8. The method of claim 7, further comprising the step of:
   storing the information received from the second voice-activated dialer at the first voice-activated dialer for a period of time such that a subsequent request to complete a call to the called party station can be accomplished without the need for steps (c)–(d).

9. The method of claim 7, further comprising the step of:
   determining if a connection could be established between the called party station and the calling party station using a public switched telephone network.

10. The method of claim 9, wherein the step of determining comprises the step of:
    sending to the called party station or a switch connected to the called party station a message requesting a connection; and
    receiving a response message indicative of whether a connection could be established with the called party station.

11. The method of claim 10, wherein the message requesting a connection is an SS7 message.

12. The method of claim 10, further comprising the step of:
    if the response message indicates that the called station is busy, then, prompting the calling party to select an option to (1) leave a voice message, (2) send a paging message, or (3) send an electronic mail (E-mail) message to the calling party.

13. The method of claim 7, further comprising the step of:
    sending additional information to the second voice-activated dialer.

14. The method as in claim 13, wherein the additional information includes calling party's name, number, picture, voice sample or biometric identification.

15. The method of claim 7, wherein step (b) comprises the step of:
    recognizing a keyword or a phrase in the first spoken utterance to determine if the called party station can be identified by the second voice-activated dialer.

16. The method of claim 7, further comprising the step of:
    if the called party station cannot be unambiguously identified using only the calling party's utterance, then requesting the calling party to provide additional input to identify the called party station.

17. A method of establishing a call between a calling party associated with a first voice-activated dialer and a called party station associated with a second voice-activated dialer that is communicatively coupled to the first voice-activated dialer, the method comprising the steps of:
    configuring the first voice activated dialer and the second voice-activated dialer to perform voice-activated dialing functions;
    (a) receiving, at the first voice-activated dialer, a first spoken utterance from the calling party, said first spoken utterance indicative of a called party station to which a connection is desired;
    (b) recognizing the first spoken utterance to determine if the called party station can be identified at the second voice-activated dialer;
    (c) translating at least a portion of the the first spoken utterance to text;
    (d) transmitting to the second voice-activated dialer at least a portion of the translated text;
    (e) in response, receiving information from the second voice-activated dialer, said information being of such type as to enable the first voice-activated dialer to complete processing the calling party's call to the called party station.

* * * * *